US009037735B1

(12) United States Patent
Fallows et al.

(10) Patent No.: US 9,037,735 B1
(45) Date of Patent: May 19, 2015

(54) ESTABLISHING WEBSOCKET PROTOCOL EXTENSIONS

(71) Applicant: Kaazing Corporation, Mountain View, CA (US)

(72) Inventors: John R. Fallows, Palo Alto, CA (US); Steven R. Atkinson, Morgan Hill, CA (US)

(73) Assignee: Kaazing Corporation, San Jose, CA (US)

( * ) Notice: Subject to any disclaimer, the term of this patent is extended or adjusted under 35 U.S.C. 154(b) by 259 days.

(21) Appl. No.: 13/837,301

(22) Filed: Mar. 15, 2013

(51) Int. Cl.
*G06F 15/16* (2006.01)
*H04L 29/06* (2006.01)
*H04L 29/08* (2006.01)
*H04L 5/14* (2006.01)
*G06F 17/30* (2006.01)

(52) U.S. Cl.
CPC .............. *H04L 67/42* (2013.01); *H04L 69/24* (2013.01); *H04L 65/1069* (2013.01); *H04L 5/1438* (2013.01); *H04L 65/1083* (2013.01); *H04L 67/141* (2013.01); *G06F 17/30861* (2013.01)

(58) Field of Classification Search
CPC ............... G06F 17/30861–17/30908; H04L 5/1438–5/1453; H04L 65/1066–65/1069; H04L 65/1083–65/1093; H04L 67/14–67/148; H04L 69/24

USPC .................................. 709/227, 228, 230, 237
See application file for complete search history.

(56) References Cited

U.S. PATENT DOCUMENTS

| 8,326,920 | B1* | 12/2012 | Modadugu et al. ........... 709/203 |
| 8,805,089 | B2* | 8/2014 | Chang et al. .................. 382/218 |
| 2013/0097239 | A1* | 4/2013 | Brown et al. .................. 709/204 |
| 2013/0263045 | A1* | 10/2013 | Minematsu et al. .......... 715/788 |
| 2014/0006660 | A1* | 1/2014 | Frei et al. ...................... 710/104 |
| 2014/0082173 | A1* | 3/2014 | Kaneko, Tsuyoshi ........ 709/223 |
| 2014/0122570 | A1* | 5/2014 | Narvaez ........................ 709/203 |
| 2014/0156725 | A1* | 6/2014 | Mandyam ..................... 709/203 |
| 2014/0181217 | A1* | 6/2014 | Jolfaei et al. .................. 709/206 |
| 2014/0201263 | A1* | 7/2014 | Ohashi .......................... 709/203 |
| 2014/0222893 | A1* | 8/2014 | Gangadharan et al. ....... 709/203 |
| 2014/0222894 | A1* | 8/2014 | Gangadharan et al. ....... 709/203 |
| 2014/0222930 | A1* | 8/2014 | Gangadharan et al. ....... 709/206 |
| 2014/0222957 | A1* | 8/2014 | Gangadharan et al. ....... 709/217 |
| 2014/0222963 | A1* | 8/2014 | Gangadharan et al. ....... 709/219 |
| 2014/0223452 | A1* | 8/2014 | Santhanam et al. .......... 719/328 |
| 2014/0324979 | A1* | 10/2014 | Gao et al. ...................... 709/204 |

* cited by examiner

*Primary Examiner* — Patrice Winder
*Assistant Examiner* — Julian Chang
(74) *Attorney, Agent, or Firm* — Van Pelt, Yi & James LLP

(57) ABSTRACT

A request to upgrade a connection to a WebSocket connection is received. A response that the connection has been upgraded to the WebSocket connection is provided. The WebSocket connection utilizes a WebSocket protocol. An identification of a set of one or more extensions to the WebSocket protocol of the WebSocket connection is received via the WebSocket connection.

20 Claims, 4 Drawing Sheets

ESTABLISHING WEBSOCKET PROTOCOL EXTENSIONS

BACKGROUND OF THE INVENTION

The WebSocket protocol enables traditional half-duplex Hypertext Transfer Protocol (HTTP) communication to be upgraded to a bi-directional, full-duplex communication channel over a Transmission Control Protocol (TCP) connection. The WebSocket protocol has been standardized by the Internet Engineering Task Force (IETF) standards organization as RFC 6455. The WebSocket protocol, as standardized, was intended to be a generalized protocol and may lack extended functionality that may be desired by a user. The WebSocket protocol standard allows the protocol to be extended using extensions to support new functionality not implemented by the standard. Typical WebSocket protocol extensions must be negotiated when a new WebSocket connection is being established. During the WebSocket initialization process, desired extensions are advertised and a confirmation is provided on which of the desired extensions will be supported for the established WebSocket connection. Because the WebSocket connection negotiation is often handled by a web browser, only extensions implemented by the web browser vendor (e.g., coded in an inaccessible trusted codebase of the web browser) are typically supported in a WebSocket connection. Therefore, addition and customization of WebSocket protocol extensions are not typically possible by an entity outside of the web browser vendor. Therefore, there exists a need for an efficient way to extend the WebSocket protocol.

BRIEF DESCRIPTION OF THE DRAWINGS

Various embodiments of the invention are disclosed in the following detailed description and the accompanying drawings.

DETAILED DESCRIPTION

Figure 1:
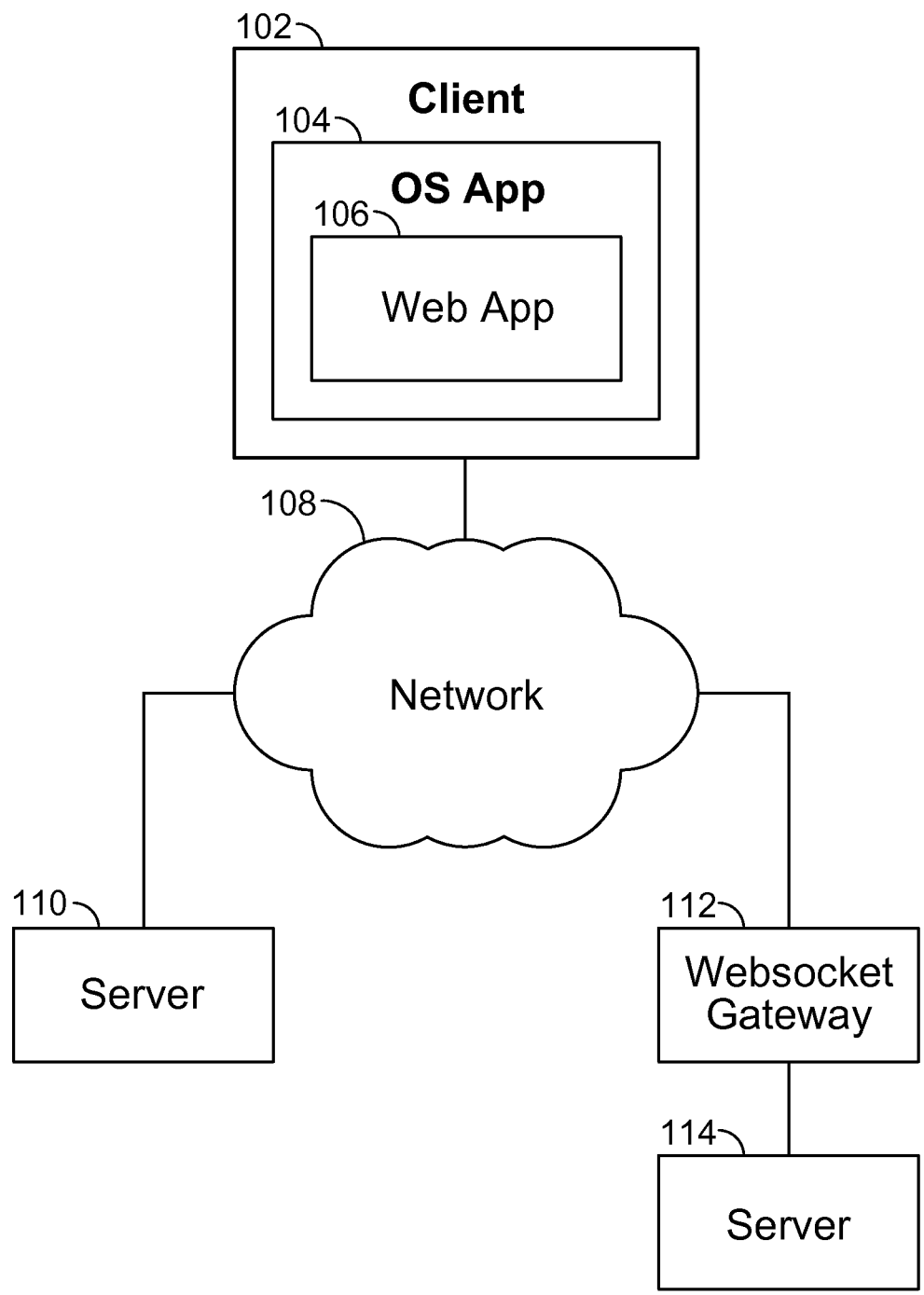
FIG. 1 is a diagram illustrating an example WebSocket communication environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The WebSocket protocol has been standardized by the Internet Engineering Task Force (IETF) standards organization as RFC 6455 (available at http://tools.ietf.org/html/rfc6455). RFC 6455 includes details on the initialization handshake and data framing of the WebSocket protocol. As specified in RFC 6455, once a WebSocket connection has been established using the handshake process between at least two communicating nodes, WebSocket communication is performed by transmitting WebSocket frames. A high-level overview of bits contained in a WebSocket frame is given in the following table reproduced from RFC 6455.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-------+-+-------------+-------------------------------+
|F|R|R|R| opcode|M| Payload |    Extended payload length    |
|I|S|S|S|  (4)  |A|   len   |             (16/64)           |
|N|V|V|V|       |S|   (7)   |          (if payload          |
| |1|2|3|       |K|         |          len==126/127)        |
+-+-+-+-+-------+-+-------------+ - - - - - - - - - - - - - - - +
| Extended payload length continued, if payload len == 127  |
+ - - - - - - - - - - - - - - - +-------------------------------+
|                               | Masking-key, if MASK          |
|                               |     set to 1                  |
+-------------------------------+-------------------------------+
| Masking-key (continued)       |          Payload Data         |
+-------------------------------- - - - - - - - - - - - - - - - +
|                     Payload Data continued ...               |
+ - - - - - - - - - - - - - - - - - - - - - - - - - - - - - - - +
|                     Payload Data continued ...               |
+---------------------------------------------------------------+
```

As shown above, the beginning portions of a WebSocket frame include metadata information regarding the configuration of data contained in the WebSocket frame. Additional details on the groups of bits in the WebSocket frame may be found in RFC 6455. The ending section of the WebSocket frame includes the actual payload data (e.g., application level data). The location of the payload data within the WebSocket frame may vary depending on the size of the payload data and whether a masking key is utilized. WebSocket frames are base units of communication data framing in WebSocket communication. By default, the WebSocket protocol may use port 80 for fixed. esregular WebSocket connections and port 443 for WebSocket connections tunneled over Transport Layer Security (TLS).

Enabling customization of WebSocket extensions is disclosed. During a typical WebSocket initialization/negotiation process, desired WebSocket protocol extensions are often advertised by a requesting client and a confirmation is provided by a server identifying which of the desired extensions will be supported for the established WebSocket connection. Because the WebSocket connection negotiation is often handled by a web browser, only extensions implemented by the web browser vendor (e.g., coded in an inaccessible trusted codebase of the web browser) are typically supported in a WebSocket connection. In some embodiments, by introducing a second negotiation process after the WebSocket connection has been established, additional and/or different WebSocket extensions can be negotiated/initialized (e.g., without modifying internal code of the web browser).

In some embodiments, a request to upgrade a connection to a WebSocket connection is received. For example, an HTTP connection is requested to be upgraded to a WebSocket connection. In some embodiments, the request identifies a sub-protocol that can be utilized to negotiate additional and/or different WebSocket protocol extensions during a subsequent negotiation process after the WebSocket connection has been established. A response that the connection has been upgraded to the WebSocket connection is provided. In some embodiments, after the WebSocket connection has been established, an identification of one or more additional WebSocket protocol extensions are received during a subsequent negotiation process. The one or more of these additional WebSocket protocol extensions may be selected to be supported for the WebSocket connection.

FIG. 1 is a diagram illustrating an example WebSocket communication environment. Client 102 is connected to server 110 and WebSocket gateway 112 via network 108. Server 114 may be accessed by client 102 via WebSocket gateway 112. Examples of client 102 include a computer, a tablet device, a smartphone, and any computing device. Client 102 may be used by a user to access services and/or content at least in part provided by server 110 and/or server 114. For example, server 110 hosts web content that is obtained by client 102. Any type of data and service may be provided by server 110 and server 114. In some embodiments, an HTTP/HTTPS connection between client 102 and server 110 is requested by client 102 to be upgraded to a WebSocket connection. In some embodiments, a stream of a SPDY protocol connection is requested to be upgraded to a WebSocket connection. In various embodiments, other protocol such as SPDY may be utilized on top of an established WebSocket connection. Server 110 may handle the request and communicate with client 102 using the WebSocket protocol. In some embodiments, a WebSocket upgrade request received by server 110 is forwarded to WebSocket gateway 112 for handling. WebSocket gateway 112 may handle WebSocket upgrade requests, a WebSocket initialization handshake, WebSocket connection configuration, WebSocket extension processing, and handling of WebSocket communication for server 110. In some embodiments, once a WebSocket upgrade request received by server 110 is forwarded to WebSocket gateway 112 for handling, data/services provided using the WebSocket protocol may be handled by WebSocket gateway 112 for server 110.

In some embodiments, an HTTP or HTTPS connection between client 102 and server 114/WebSocket gateway 112 is requested by client 102 to be upgraded to a WebSocket connection. WebSocket gateway 112 enables content and/or services provided by server 114 to be accessed via a WebSocket protocol. For example, WebSocket gateway 112 handles WebSocket upgrade requests, a WebSocket initialization handshake, WebSocket connection configuration, WebSocket extension processing, and handling of WebSocket frames for server 114. WebSocket gateway 112 may proxy communication between client 102 and server 114, at least in part by allowing WebSocket gateway 112 to encode communication sent by server 114 into WebSocket frames to be sent to client 102 and decoding received by WebSocket frames from client 102 into a data format desired by server 114. By utilizing WebSocket gateway 112, server 114 can take advantage of the WebSocket protocol without the need to directly implement the entire WebSocket protocol.

Client 102 includes operating system level application (OS App) 104. OS App 104 is at least in part hosting (e.g., at least in part executing) web application 106. For example, OS App 104 is a web browser and web application 106 is a Javascript application executed using the web browser. In another example, OS App 104 is a mobile device application and web application 106 is a component of the mobile device application. Other examples of OS App 104 include any application executing on an operating system hosted by client 102. In some embodiments, protocol level processing of WebSocket communication is handled by OS App 104 for web application 106. For example, when a WebSocket connection is requested by web application 106, OS App 104 handles the handshake, protocol control, protocol configuration, and WebSocket frame and message processing to allow only the web application level data contained in a payload portion of a WebSocket frame to be sent to web application 106.

In some embodiments, the protocol level processing of OS App 104 is handled by a portion of OS App 104 that can only be modified by a developer with access to the protected internal code of OS App 104. In order to extend the WebSocket protocol, a software library utilized by web application 106 may be utilized to handle custom WebSocket protocol extensions (e.g., WebSocket protocol extensions not directly supported by the operating system level application). In some embodiments, a standard WebSocket library (e.g., standard WebSocket library for Javascript) that exposes WebSocket capability to web application 106 is replaced with a custom WebSocket software library (e.g., custom WebSocket software library for JavaScript) that allows custom WebSocket protocol extensions to be dynamically utilized without modifying protected internal (e.g., native) code of the OS App. The custom WebSocket library may be backwards compatible with the standard WebSocket library. For example, a web application coded using the standard WebSocket library may utilize the custom WebSocket library (e.g., same syntax and base functionality and conforms to the same WebSocket application programming interface (API)). In some embodiments, web application 106 is configured to use the custom WebSocket library when a code of web application 106 is modified to utilize the custom WebSocket library instead of a standard WebSocket library. For example, when a component (e.g., JavaScript code) of web application 106 is obtained from server 114 via network 108 and gateway 112, gateway 112 modifies the component to utilize the custom WebSocket library (e.g., inserts code to load the custom WebSocket library).

In some embodiments, an intermediate software process/object interfacing between OS App 104 and web application 106 handles WebSocket extension negotiation, configuration, and processing. For example, the intermediate process/object initializes and negotiates custom WebSocket extensions to be utilized and intercepts data traffic between OS App 104 and web application 106 to handle processing required by one or more utilized custom WebSocket extensions. In some embodiments, the intermediate process/object is a process/object of a custom WebSocket library (e.g., web application 106 is configured to use the custom WebSocket library when a code of web application 106 is modified to utilize the custom WebSocket library instead of a standard WebSocket library). In some embodiments, OS App 104 is customizable and protocol level processing of OS App 104 may be modified by an outside developer. For example, an add-on program coded for OS App 104 may modify protocol level processing of OS App 104. This add-on program may enable custom/dynamic WebSocket protocol extensions.

Examples of network 108 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. One or more of the components shown in FIG. 1 may be included in the same machine. Other communication paths may exist and the example of FIG. 1 has been simplified to illustrate the example clearly. Although single instances of components have been shown to simplify the diagram, additional instances of any of the components shown in FIG. 1 may exist. For example, multiple clients may be communicating with multiple servers that may be utilizing multiple WebSocket gateways. Additional OS Apps and web applications may be hosted by client 102. Components not shown in FIG. 1 may also exist.

Figure 2:
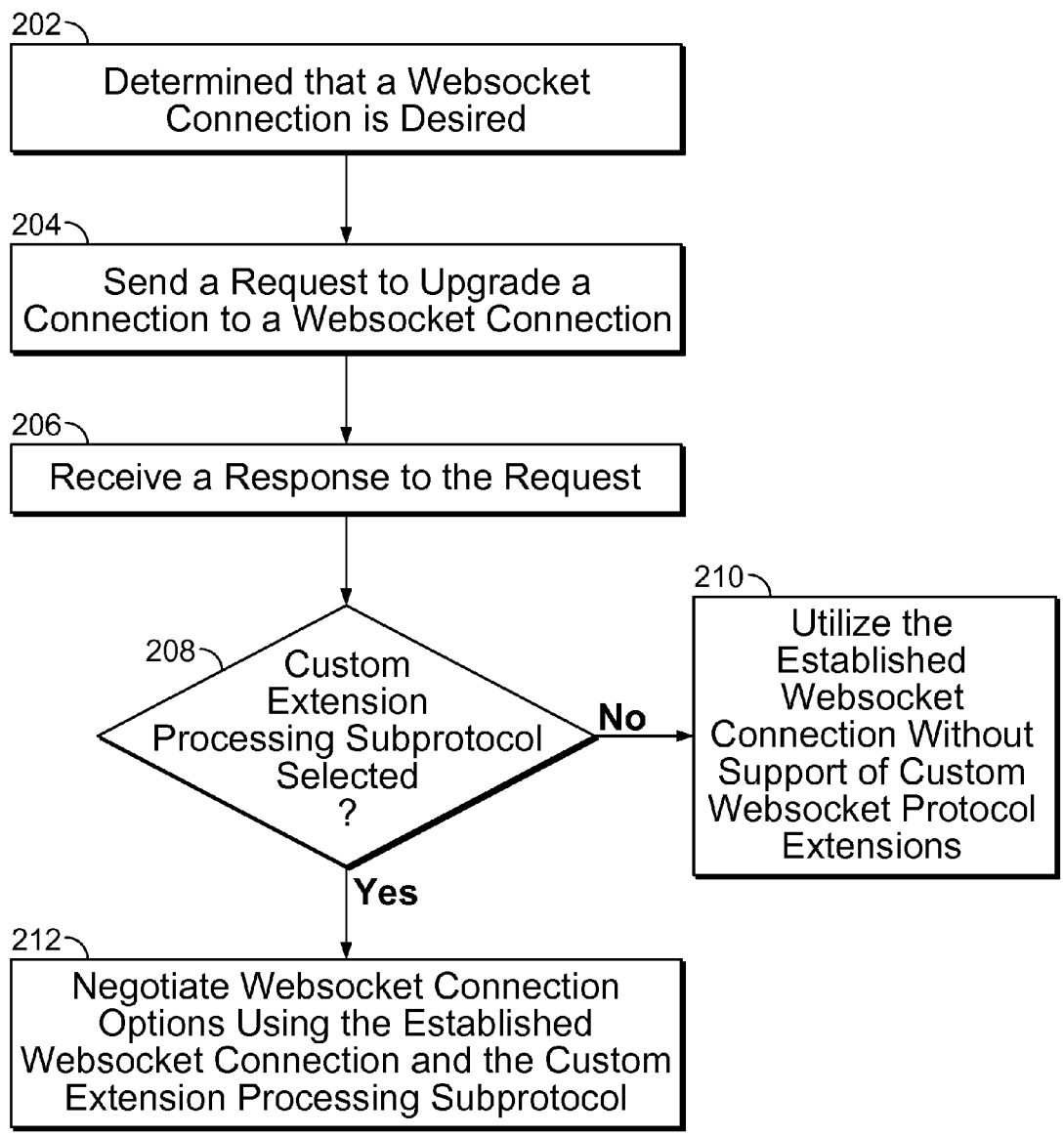
FIG. 2 is a flowchart illustrating an embodiment of a process for requesting a WebSocket connection.

FIG. 2 is a flowchart illustrating an embodiment of a process for requesting a WebSocket connection. The process of FIG. 2 may be implemented on one or more components of client 102 of FIG. 1.

At 202, it is determined that a WebSocket connection is desired. In some embodiments, determining that the WebSocket connection is desired includes receiving a request (e.g., from an application such as web application 106 of FIG. 1) that a WebSocket connection is desired. In some embodiments, determining that the WebSocket connection is desired includes detecting that a WebSocket connection is desired. In some embodiments, determining that the WebSocket connection is desired is associated with visiting a website, launching an application, and/or a request to obtain content available via a WebSocket connection. The determination that a WebSocket connection is desired may be associated with an existing HTTP/HTTPS connection that is to be upgraded to a WebSocket connection. In some embodiments, the determination that a WebSocket connection is desired is made by an operating system level application such as OS App 104 of FIG. 1. For example, a web application running on a web browser signals to the web browser that an HTTP/HTTPS connection is to be upgraded to a WebSocket connection. In another example, when an application such as a mobile application is launched, an HTTP/HTTPS connection to a server is initialized and it is determined that the HTTP/HTTPS connection is to be upgraded to a WebSocket connection. In some embodiments, the WebSocket connection enables the half-duplex HTTP/HTTPS communication to be upgraded to a bi-directional, full-duplex communication channel over a TCP connection or any other bidirectional byte stream with guaranteed delivery and ordering.

In some embodiments, determining that the WebSocket connection is desired includes obtaining a component that can be utilized to handle custom/dynamic WebSocket extensions. For example, in order to extend the WebSocket protocol, a software library utilized by a web application such as web application 106 of FIG. 1 or utilized by an application such as a mobile device application to handle custom and dynamic WebSocket extensions is obtained. In some embodiments, a standard WebSocket library (e.g., standard WebSocket library for Javascript) that implements the WebSocket API for an application is replaced with a custom software library (e.g., custom WebSocket library for Javascript) that allows custom WebSocket extensions to be dynamically utilized. The custom WebSocket library may be backwards compatible with the standard WebSocket library. For example, a web application coded using the standard WebSocket library may utilize the custom WebSocket library (e.g., conforms to the same WebSocket API). In some embodiments, obtaining the component includes receiving program code configured to use the custom WebSocket library rather than a standard WebSocket library. For example, when the component (e.g., JavaScript code) is requested, a gateway such as gateway 112 of FIG. 1 modifies the component obtained from a server to utilize the custom WebSocket library (e.g., inserts code to load the custom WebSocket library) and provides the modified component. Subsequent calls to a WebSocket API to establish a WebSocket connection are handled by the replacement custom WebSocket library rather than the standard WebSocket library that has been replaced.

At 204, a request to upgrade a connection to a WebSocket connection is sent. The request may be sent to a server of the connection such as server 110, server 114, and/or WebSocket gateway 112 of FIG. 1. In some embodiments, sending the request includes initializing a WebSocket handshake to upgrade the connection. The connection may be an already established HTTP/HTTPS connection and/or a new HTTP/HTTPS connection established in response to the determination made at 202. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the request to update the connection is managed by an operating system-level application such as OS App 104 of FIG. 1. In some embodiments, sending the request includes performing a WebSocket initialization handshake as specified in the WebSocket standard. For example, the request includes a specification of one or more supported subprotocols that can be utilized for the WebSocket connection. For example, data to be communicated using the WebSocket connection is to be formatted using a subprotocol (e.g., Advanced Message Queuing Protocol (AMQP)) communicated over the WebSocket protocol. The WebSocket standard allows one or more subprotocols to be identified in a WebSocket connection request and the other communication party (e.g., server) selects one of the specified subprotocols to be utilized for the WebSocket connection. In some embodiments, the request includes identification of one or more extended capabilities of a client that are not directly specified in the WebSocket protocol standard (i.e., WebSocket protocol extensions). For example, the request includes one or more identifiers of one or more extended capabilities of the WebSocket protocol that are supported by a client sending the request. A server receiving the request may choose to support one or more of the identified extensions in the WebSocket connection being established.

In some embodiments, a WebSocket connection requested in 204 is requested by a web application such as web application 106 of FIG. 1 and the request is made via a software library component (e.g., Javascript library component handling WebSocket, Ruby on Rails component handling WebSocket, or any other programming language library component handling WebSocket) that interfaces with an operating system level application (e.g., a web browser) such as OS App 104 of FIG. 1 to establish the WebSocket connection. Typically, the web application provides, to a process of the software library component, one or more identifiers of desired subprotocols to be utilized for a WebSocket connection to be established and the process provides the identifiers to the web browser that will be establishing the WebSocket connection.

In some embodiments, the operating system level application (e.g., a web browser) requests predetermined WebSocket protocol extensions supported by the operating system level application. In some embodiments, a custom software library component (e.g., component received at 202) of an application (e.g., web application 106 of FIG. 1) supports WebSocket protocol extensions that are not natively supported by an operating system level application (e.g., a web browser). For example, a process implementing the custom software library component establishes a WebSocket connection using a custom extension processing subprotocol used to configurably enable WebSocket extensions not directly implemented/supported by the operating system level application. A process of the custom software library component may perform a second level of negotiations after a WebSocket connection has been established to configure a requested subprotocol (e.g., subprotocol requested by web application when requesting WebSocket connection) and any additional custom WebSocket protocol extensions to be utilized for the WebSocket connection. The process of the custom software library component may also serve as an intermediary to translate between the first subprotocol used to enable custom WebSocket extensions and a different requested subprotocol of the underlying web application and to intercept and process WebSocket communication needed to handle the custom WebSocket protocol extensions.

In some embodiments, when a web application such as web application 106 of FIG. 1 or another type of application (e.g., mobile device application) requests a WebSocket connection that will use one of one or more identified subprotocols, a custom software library component handling WebSocket communication attempts to establish a WebSocket communication that will use a different subprotocol. For example, the web application requests to the custom software library component a WebSocket connection utilizing an AMQP subprotocol, and the custom software library component requests to an operating system level program a WebSocket connection that can utilize the custom extension processing subprotocol rather than the AMQP subprotocol, if possible. The operating system level program requests a WebSocket connection that will utilize the requested subprotocol(s) of the custom software library component.

The example below shows at least a portion of the contents of the request to upgrade the connection. The request example below may be provided by client 102 to a server of the connection such as server 110, server 114, and/or WebSocket gateway 112 of FIG. 1.

GET /amqp HTTP/1.1
Host: server.example.com
Upgrade: websocket
Sec-WebSocket-Protocol: x-kaazing-handshake, amqp
Sec-WebSocket-Extensions: E1-native The first three lines of this example conform to the WebSocket standard for requesting a connection to be upgraded to a WebSocket connection with the end point of the WebSocket connection of "/amqp" and the host in use as "server.example.com".

The line beginning with "Sec-WebSocket-Protocol:" identifies the potential subprotocols that can be used for the WebSocket connection to be established. In the example above, the request identifies two subprotocols that may be used for the WebSocket connection to be established and a server receiving the request is to select at most one of the subprotocols to be utilized for the WebSocket connection. The "amqp" identifier identifies that an AMQP protocol (e.g., a subprotocol identified by a web application such as web application 106 of FIG. 1) is one of the possible subprotocols that may be utilized to encode data traffic of the WebSocket connection. The "x-kaazing-handshake" identifier identifies that a custom protocol identified as "x-kaazing-handshake" is identified as another one of the possible WebSocket connections. This custom protocol is a subprotocol requested by a custom software library component to enable custom WebSocket protocol extensions. For example, the web application requests to the custom software library component a WebSocket connection utilizing an AMQP subprotocol, and the custom software library component requests to an operating system level program a WebSocket connection that can utilize the "x-kaazing-handshake" subprotocol rather than the AMQP subprotocol, if possible. By requesting the custom "x-kaazing-handshake" subprotocol, a requesting client is advertising to a receiving server that the client is able to handle custom WebSocket extensions using the "x-kaazing-handshake" subprotocol. If the "x-kaazing-handshake" ends up being selected as the subprotocol to be utilized, the client and the server of the WebSocket connection can communicate with each other using this custom protocol to negotiate and handle custom WebSocket protocol extensions.

The line beginning with "Sec-WebSocket-Extensions:" identifies any number of WebSocket protocol extensions that can be supported by a client sending the request. A receiving server may choose any number of the identified extensions to be utilized for the WebSocket connection to be established. Typically the supported WebSocket protocol extensions are ones natively supported by an operating system level application such as a web browser. Support for new or custom extensions often cannot be achieved without modifying code of the operating system level application, which may be difficult to achieve by a party without access to the protected internal code of the operating system application. In the example above, the request identifies a WebSocket extension identified as "E1-native". This extension is an extension natively supported by an operating system level application requesting the WebSocket connection and is requested by the operating system level application for every WebSocket connection requested.

At 206, a response to the request is received. In some embodiments, the request is received from a server such as server 110/114 or a gateway such as gateway 112 of FIG. 1. In some embodiments, the response conforms to the handshake response of the WebSocket standard. In some embodiments, the response confirms whether a WebSocket connection has been successfully established. In some embodiments, if the response indicates that a WebSocket connection has not been successfully established, the process ends and an error message is provided. In some embodiments, the response includes an identifier of a subprotocol selected from a list of one or more supported subprotocols identified in the request sent at 204. In some embodiments, the response includes an identifier of one or more WebSocket extensions selected from a list of one or more supported extensions identified in the request sent at 204. The example below shows at least a portion of the contents of the received response.

HTTP/1.1 101 Switching Protocols
Upgrade: websocket
Connection: Upgrade
Sec-WebSocket-Protocol: x-kaazing-handshake
Sec-WebSocket-Extensions: E1-native The three lines of the example above confirms (e.g., identified by the identifier "101") that the requested WebSocket connection has been successfully established. The line beginning with "Sec-WebSocket-Protocol:" identifies the selected subprotocol that will be utilized by the established WebSocket connection. In the example above, "x-kaazing-handshake" has been selected. The selection of this custom protocol signifies that the server that received the request sent in 204 supports custom WebSocket protocol extensions and this custom subprotocol can be used to negotiate and process the custom extensions. The line beginning with "Sec-Web-Socket-Extensions:" identifies any number of selected WebSocket protocol extensions that will be utilized in the established WebSocket connection. In the example above, a WebSocket protocol extension natively supported by an operating system level program and identified as the "E1-native" has been selected.

At 208, it is determined whether a custom extension processing subprotocol has been selected. In some embodiments, determining whether the custom subprotocol has been selected includes analyzing the response received at 206 to determine which subprotocol has been selected as the utilized subprotocol and determining whether the selected subprotocol is the custom extension processing subprotocol requested in the request provided at 204. For example, it is determined whether the selected protocol is the "x-kaazing-handshake" protocol described in the previously described examples. The selection of this custom subprotocol signifies that the server that received the request sent in 204 supports custom WebSocket protocol extensions and this custom subprotocol can be used to communicate and handle the custom extension processing. If the custom extension processing subprotocol has not been selected, it signifies that the server that received the request sent in 204 does not support custom extensions. For example, the "amqp" protocol described in the previously described examples has been selected as the subprotocol and it is determined that the custom extension processing subprotocol has not been selected.

If at 208 it is determined that the custom extension processing subprotocol has not been selected, at 210, the established WebSocket connection is utilized without support of custom WebSocket protocol extensions. For example, it is determined that additional and/or configurable WebSocket protocol extensions that may be desired in addition to any natively supported extensions (e.g., extensions supported by a web browser) cannot be utilized. In an alternative embodiment, if it is determined that the custom extension processing subprotocol has not been selected, the process ends and an error indicator is provided.

If at 208 it is determined that the custom extension processing subprotocol has been selected, at 212, WebSocket connection options are negotiated using the established WebSocket connection and the custom extension processing subprotocol. In some embodiments, negotiating the WebSocket connection options includes identifying a subprotocol and any number of custom WebSocket protocol extensions to be utilized for the established WebSocket connection. For example, a second handshake process similar to the first handshake performed at 204 and 206 (e.g., conforms to WebSocket standard handshake) is performed using the custom subprotocol negotiated during the first handshake.

In some embodiments, negotiating the WebSocket connection options includes providing a secondary request (e.g., second request). The secondary request may be provided via the established WebSocket connection using the WebSocket protocol and WebSocket communication frames. The request may be provided from a client such as client 102 to server 110/114 and/or gateway 112 of FIG. 1. In some embodiments, the request conforms to the WebSocket standard for the WebSocket initialization handshake. The request may include identification of one or more desired subprotocols and identification of any additional custom WebSocket protocol extensions to be utilized for the established WebSocket connection.

The example below shows at least a portion of the contents of the request.

GET /amqp HTTP/1.1
Host: server.example.com
Upgrade: websocket
Sec-WebSocket-Protocol: amqp
Sec-WebSocket-Extensions: E2-application The first three lines of the example conform to the WebSocket standard for requesting a connection to be upgraded to a WebSocket connection with the end point of the WebSocket connection of "/amqp" and the host in use as "server.example.com". Because the WebSocket connection has been established, these lines may not be utilized for the purpose of establishing a WebSocket connection. These lines may be utilized to maintain compatibility. In some embodiments, these lines are optional and/or not included in the request. For example, only data different from the request sent in 204 is sent at 212.

The line beginning with "Sec-WebSocket-Protocol:" identifies the potential subprotocols that can be used for the WebSocket connection. Because a WebSocket connection with the custom protocol has been already established, the subsequently identified subprotocols identify the supported protocols of the end WebSocket communication user application such as web application 106 of FIG. 1, and one of the identified subprotocols will be selected by a receiving server such as gateway 112 of FIG. 1 for use (e.g., selected subprotocol encoded data is encoded using the custom subprotocol and the custom subprotocol encoded data is encoded in WebSocket protocol) in the established WebSocket connection. The "amqp" identifier identifies that an AMQP protocol (e.g., a subprotocol requested by a web application such as web application 106 of FIG. 1) is one of the possible subprotocols that may be utilized for the WebSocket connection. For example, if this subprotocol is selected, an AMQP subprotocol will be communicated over the "x-kaazing-handshake" subprotocol that is communicated over the WebSocket protocol of the WebSocket connection.

The line beginning with "Sec-WebSocket-Extensions:" identifies any number of custom WebSocket protocol extensions that can be supported for the established WebSocket connection. In some embodiments, these custom WebSocket protocol extensions are not natively supported by an operating system level application such as OS App 104 of FIG. 1. The custom WebSocket protocol extensions may be implemented by a custom software library (e.g., a custom WebSocket library that replaced a standard WebSocket library) of an application such as web application 106 of FIG. 1. In some embodiments, the custom WebSocket protocol extensions to be supported may be preconfigured and/or dynamically determined. In some embodiments, the custom WebSocket protocol extensions to be requested are preconfigured in a custom software library. In some embodiments, the custom WebSocket protocol extensions to be requested are determined from a dynamically received configuration data. For example, specification of which custom WebSocket protocol extension to request and program code implementing the custom WebSocket protocol extensions are received at one or more components of client 102 from gateway 112 of FIG. 1. A receiving server may choose any number of the identified extensions to be utilized for the WebSocket connection. In the example above, the request identifies a WebSocket extension identified as "E2-application". This extension identified a desired a custom extension to be supported on the established WebSocket connection being utilized to send the request.

In some embodiments, negotiating the WebSocket connection options includes receiving a secondary response (e.g., second response). The response may be received via the established WebSocket connection using the WebSocket protocol and WebSocket communication frames. The response may be received at a client such as client 102 from server 110 and/or gateway 112 of FIG. 1. In some embodiments, the response conforms to the WebSocket standard for the WebSocket initialization handshake. The response may include identification of a subprotocol (e.g., one of the subprotocols identified in the secondary request) and an identification of any number of supported custom extensions (e.g., one or more of the requested custom extensions in the secondary request).

The example below shows at least a portion of the contents of the received response.

HTTP/1.1 101 Switching Protocols
Sec-WebSocket-Protocol: amqp
Sec-WebSocket-Extensions: E2-application The first line of the example above includes a status indicator indicating a status of the secondary request (e.g., second request). In some embodiments, the status indictor conforms to the WebSocket standard handshake response indicator and/or an HTTP status code. In the example above, the identifier "101" indicates that a subprotocol and supported custom extensions have been successfully negotiated and are ready to be utilized. In some embodiments, negotiating the WebSocket connection options includes performing one or more steps based on the received status indicator. For example, a status indicator of "401 Authentication required" is received and negotiating the WebSocket connection options includes authenticating an identity of the sender of the request by providing authentication credentials. The line beginning with "Sec-WebSocket-Protocol:" identifies the selected subprotocol that will be utilized by the established WebSocket connection. In the example above, "amqp" has been selected. The selection of this protocol signifies that the server that received the request sent in 204 supports the AMQP subprotocol and this subprotocol will be communicated over the custom subprotocol (e.g., "x-kaazing-handshake" subprotocol). The line beginning with "Sec-WebSocket-Extensions:" identifies any number of selected custom WebSocket protocol extensions that will be utilized in the established WebSocket connection. In the example above, a WebSocket protocol extension not natively supported by an operating system level program (e.g., custom extension) and identified as the "E2-application" has been selected and identified as being supported.

Figure 3:
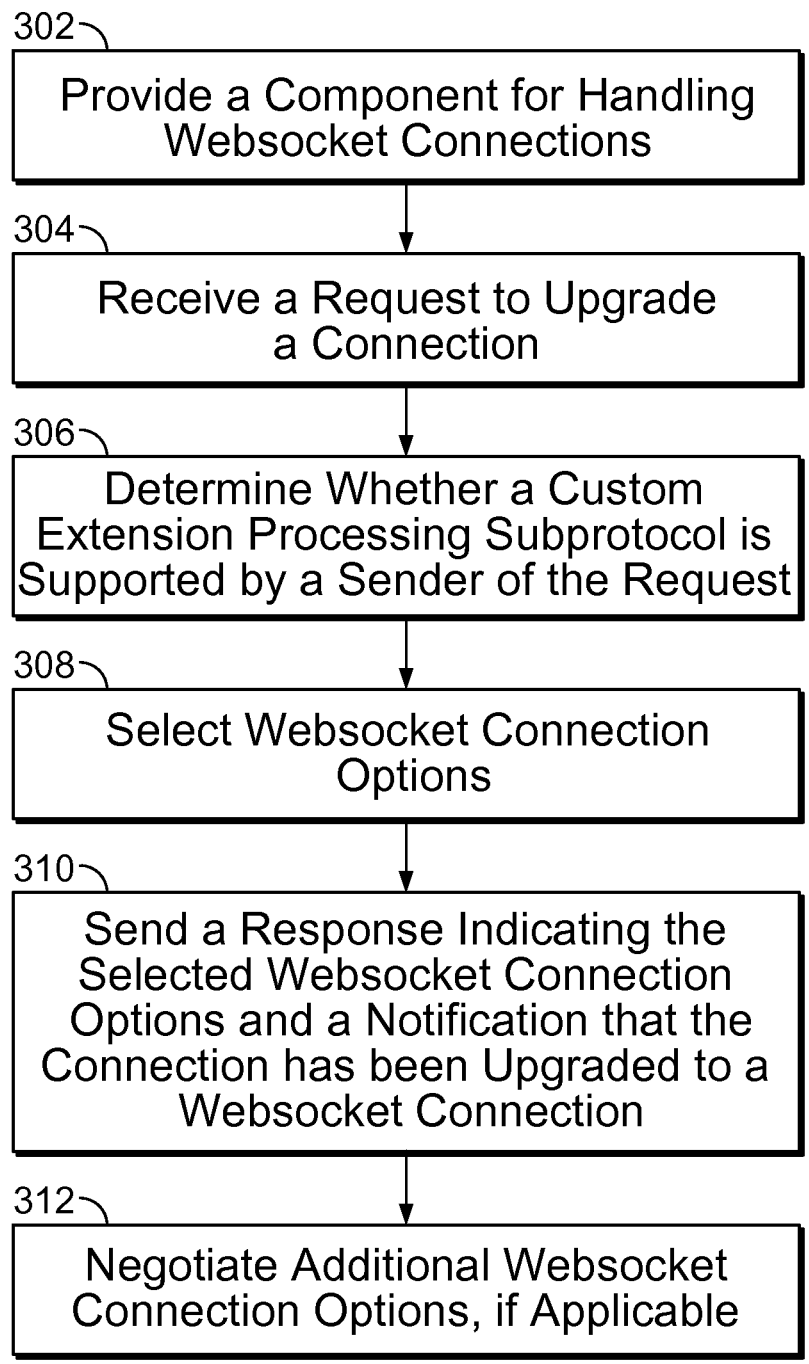
FIG. 3 is a flowchart illustrating an embodiment of a process for confirming a request to establish a WebSocket connection.

FIG. 3 is a flowchart illustrating an embodiment of a process for confirming a request to establish a WebSocket connection. The process of FIG. 3 may be implemented on one or more components of server 110, server 114, and/or WebSocket gateway 112. In some embodiments, the process of FIG. 3 is at least in part implemented by a receiving communication party of one or more requests sent using at least a portion of the process of FIG. 2.

At 302, a component for handling WebSocket connections is provided. In some embodiments, providing the component includes providing a component that can be utilized to handle custom WebSocket protocol extensions. For example, in order to extend the WebSocket protocol, a software library component to be utilized by a web application such as web application 106 of FIG. 1 or to be utilized by an application such as a mobile device application to handle custom WebSocket protocol extensions is provided. In some embodiments, a standard WebSocket library (e.g., standard WebSocket library for Javascript) that implements a WebSocket API for an application is to be replaced with the custom library (e.g., custom WebSocket library for Javascript) that allows custom WebSocket extensions to be dynamically utilized. The custom WebSocket library may be backwards compatible with the standard WebSocket library. For example, a web application coded using the standard WebSocket library is configured to utilize the custom WebSocket library (e.g., conforms to the same WebSocket API). In some embodiments, providing the component includes providing program code configured to use the custom WebSocket library rather than a standard WebSocket library. For example, when code (e.g., JavaScript code of the web application) is requested, the code is modified to utilize a custom WebSocket library (e.g., insert additional code to load the custom WebSocket library) and the modified code is provided. Subsequent calls in the provided code to a WebSocket API to establish a WebSocket connection will be handled by the replacement custom WebSocket library rather than the standard WebSocket library that has been replaced.

At 304, a request to upgrade a connection is received. In some embodiments, the request includes the request sent at 204 of FIG. 2. In some embodiments, the request is associated with visiting a website, launching an application, and/or a request to obtain content available via a WebSocket connection. In some embodiments, the request was made by an operating system level application such as OS App 104 of FIG. 1. For example, a web browser has made the request in response to a web application running on the web browser that has requested the WebSocket connection. In another example, when an application such as a mobile application is launched, an HTTP/HTTPS connection to a server for the mobile application is initialized and a request to upgrade the HTTP/HTTPS connection is sent to the server.

In some embodiments, the request is associated with initializing a WebSocket handshake to upgrade the connection. The connection may be an already established HTTP/HTTPS connection and/or a new HTTP/HTTPS connection established in response to the determination made at 202 of FIG. 2. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the received request initializes an opening handshake as described in the WebSocket standard. In some embodiments, the request includes identification of one or more capabilities of a client that are not directly implemented in the WebSocket protocol standard. For example, the request includes one or more identifiers of one or more extended capabilities of the WebSocket protocol that are supported by a client sending the request.

At 306, it is determined whether a custom extension processing subprotocol is supported by a sender of the request. In some embodiments, determining whether the custom subprotocol is supported includes analyzing the request received at 304 and determining whether an identifier of the custom subprotocol is included in the list of supported subprotocols provided in the request. For example, it is determined whether the protocol "x-kaazing-handshake" described in examples of FIG. 2 is included in the request. The support of this custom subprotocol may signify that the sender of the request supports custom extensions and this custom subprotocol can be used to communicate and handle the custom extension processing. If the custom extension processing subprotocol has not been included, it may signify that the sender of the request does not support custom extensions.

At 308, WebSocket connection options are selected. In some embodiments, selecting the WebSocket connection options includes configuring the WebSocket connection and/or options associated with the WebSocket connection. In some embodiments, selecting the WebSocket connection options includes determining which one or more of the provided configuration options provided in the request received at 304 should be supported. In some embodiments, the received request includes a plurality of possible configuration options and only one of the options is to be selected by the receiver of the request. For example, the request includes one or more identifiers of subprotocols that can be utilized in the WebSocket connection being established and one of the identified subprotocols is selected. In some embodiments, if it is determined at 306 that the custom extension processing subprotocol is supported by the sender, the custom extension processing subprotocol is selected as the subprotocol of the WebSocket connection being established. In some embodiments, if it is determined at 306 that the custom extension processing subprotocol is not supported by the sender, another one of the subprotocols identified in the request received at 304 and determined to be supported by the receiver of the request is selected as the subprotocol of the WebSocket connection being established. In some embodiments, the received request includes a plurality of possible configuration options and one or more of the options are to be selected by the receiver of the request. For example, the request includes one or more identifiers of WebSocket protocol extensions (e.g., extended capability of the WebSocket protocol), and it is determined which of the WebSocket protocol extensions are supported by the receiver of the request. In some embodiments, if it is determined that the received request is not a valid request (e.g., a supported subprotocol not identified), a WebSocket connection is not established, an error response is provided, and the process ends.

At 310, a response indicating the selected WebSocket connection options and a notification that the connection has been upgraded to a WebSocket connection are sent. The response may be sent to a client by a server such as server 110, server 114, and/or WebSocket gateway 112 of FIG. 1. In some embodiments, sending the response includes sending a response to a WebSocket handshake upgrade request received in 304. In some embodiments, sending the response includes completing an opening handshake as defined in the WebSocket standard. In some embodiments, the response sent at 310 includes the response received at 206 of FIG. 2.

At 312, additional WebSocket connection options are negotiated, if applicable. In some embodiments, additional WebSocket connection options are not negotiated if it was determined at 306 that the custom extension processing subprotocol is not supported by a sender of the request and/or a subprotocol selected at 308 is not the custom extension processing subprotocol.

In some embodiments, additional WebSocket connection options are negotiated if it was determined at 306 that the custom extension processing subprotocol is supported by a sender of the request and/or a subprotocol selected at 308 is the custom extension processing subprotocol. In some embodiments, negotiating the additional WebSocket connection options includes receiving a secondary request (e.g., second request). For example, the request sent at 212 of FIG. 2 is received. The request may be provided from a client such as client 102 to server 110 and/or gateway 112 of FIG. 1. In some embodiments, the request conforms to the WebSocket standard for a WebSocket initialization handshake. The request may include identification of one or more subprotocols and identification of any additional custom WebSocket protocol extensions to be utilized for the established WebSocket connection.

For example, the request identifies potential subprotocols that can be used for the WebSocket connection. Because a WebSocket connection using the custom protocol has been already established, the identified subprotocols of the secondary request identify the supported protocols of an application such as web application 106 of FIG. 1. One of the identified subprotocols of the secondary request may be selected by a receiving server such as gateway 112 of FIG. 1 for use in the established WebSocket connection.

In another example, the secondary request identifies any number of custom WebSocket protocol extensions that can be supported in the established WebSocket connection. The custom WebSocket protocol extensions may be implemented by a custom software library component (e.g., component of a custom library that replaced a standard WebSocket library) provided at 302. In some embodiments, the custom WebSocket protocol extensions to be supported may be preconfigured and/or dynamically determined. In some embodiments, the custom WebSocket protocol extensions are preconfigured in the provided component of 302. In some embodiments, the custom WebSocket protocol extensions to be supported are determined from a dynamically received configuration. A receiving server may choose any number of the identified extensions to be utilized for the WebSocket connection.

In some embodiments, negotiating the additional WebSocket connection options includes sending a secondary response (e.g., second response). For example, the secondary response received at 212 of FIG. 2 is received. The response may be sent via the established WebSocket connection using the WebSocket protocol and WebSocket communication frames. The response may be provided to a client such as client 102 from server 110 and/or gateway 112 of FIG. 1. In some embodiments, the response conforms to the WebSocket standard for WebSocket initialization handshake. The response may include identification of a selected subprotocol (e.g., one of the subprotocols identified in the secondary request) and identification(s) of any number of supported custom extensions (e.g., one or more of the requested custom extensions in the secondary request). In some embodiments, the response includes a status indicator indicating a status of the secondary request. In some embodiments, the status indictor conforms to the WebSocket standard handshake response indicator and/or an HTTP status code. For example, an identifier "101" included in the response indicates that a subprotocol and supported custom extensions have been successfully negotiated and are ready to be utilized. In another example, a status indicator of "401 Authentication required" is included and negotiating the WebSocket connection options includes authenticating an identity of the sender of the request by verifying provided authentication credentials.

In some embodiments, in the event an operating system level application can be directly modified/supplemented to support additional and/or different WebSocket protocol extensions (e.g., by using a web browser plug-in, web browser add-on, web browser extension), the custom WebSocket protocol extensions described previously can be negotiated in a single negotiation rather than two negotiations (e.g., one request and one response rather than two requests and two responses). For example, a single request that identifies both the native and customized WebSocket protocol extensions (e.g., includes line "Sec-WebSocket-Extensions: E1-native, E2-application") is sent from a requesting client and the receiving server provides a single response confirming that the identified native and customized extensions are supported for an established WebSocket connection. In some embodiments, a determination (e.g., predetermined or dynamically determined) is made on whether to perform a double negotiation (e.g., described in the process of FIG. 2 and/or 3) or a single combined negotiation based at least in part on whether an operating system level application has been modified/supplemented to support the combined negotiation. If a combined negotiation is supported, the customized subprotocol described in the processes of FIG. 2 and/or 3 may not need to be utilized.

Figure 4:
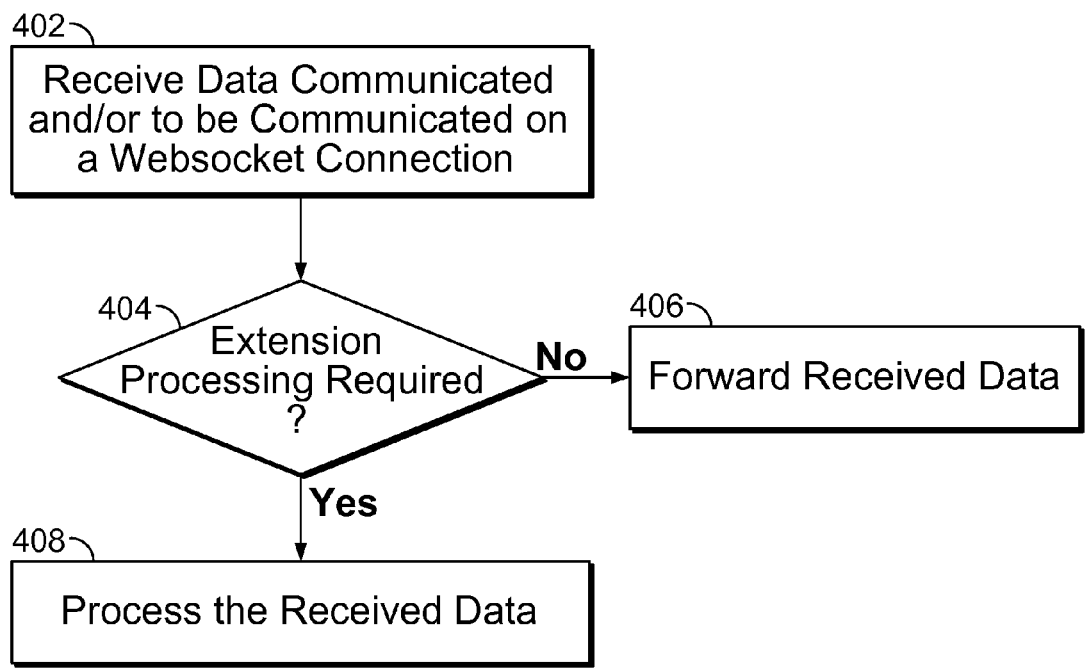
FIG. 4 is a flowchart illustrating an embodiment of a process for processing WebSocket communication data.

FIG. 4 is a flowchart illustrating an embodiment of a process for processing WebSocket communication data. The process of FIG. 4 may be implemented on one or more components of client 102 of FIG. 1.

At 402, data communicated and/or to be communicated on a WebSocket connection is received. In some embodiments, the WebSocket connection includes the WebSocket connection established using the process of FIG. 2 and/or 3. In some embodiments, the received data includes data to be communicated between an operating system level application (e.g., OS App 104 of FIG. 1) and a web application (e.g., web application 106 of FIG. 1). For example, a process of a custom software library implementing the WebSocket API intercepts communication to and/or from an operating system level application to perform any required processing to implement custom WebSocket protocol extensions. The custom software library may include the component provided at 302 of FIG. 3. The custom WebSocket protocol extensions may include custom WebSocket protocol extensions negotiated at 212 of FIG. 2 and/or 312 of FIG. 3.

At 404, it is determined whether extension processing is required. In some embodiments, the determination is made at least in part by analyzing the received data. For example, it is determined that extension processing is required if a certain data (e.g., identifier bit(s), control byte sequence, etc.) is included in the contents of the received data. In some embodiments, determining whether extension processing is required includes determining any processing required to perform a function of a WebSocket protocol extension.

If at 404 it is determined that extension processing is not required, at 406, the received data is forwarded. In some embodiments, forwarding the received data includes converting from a first subprotocol to a second subprotocol before sending the received data to an intended destination. For example, data is translated between an "x-kaazing-handshake" protocol and an "amqp" protocol described in the examples above.

If at 404 it is determined that extension processing is required, at 408, the received data is processed. In some embodiments, processing the received data includes performing processing required to perform/implement a function of a WebSocket protocol extension. The processed data may be translated (from a first subprotocol to a second subprotocol) and/or forwarded to an intended destination.

Although the examples above discuss upgrading an existing HTTP/HTTPS to a WebSocket connection, in some embodiments, another type of connection such as a stream of a SPDY protocol connection is requested to be upgraded to a WebSocket connection. In various embodiments, other protocol such as SPDY may be utilized with (e.g., underlying) an established WebSocket connection.

Although the examples above discuss upgrading an existing HTTP/HTTPS connection to a WebSocket connection, in some embodiments, a protocol other than the WebSocket protocol may be used. For example, another protocol that changes an HTTP/HTTPS connection to a bi-directional, full-duplex communication channel may be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to:
receive a request to upgrade a connection to a WebSocket connection;
provide a response that the connection has been upgraded to the WebSocket connection, wherein the WebSocket connection utilizes a WebSocket protocol; and
receive via the WebSocket connection, after the response has been received, an identification of a set of one or more extensions to the WebSocket protocol of the WebSocket connection; and a processor coupled with the communication interface.

2. The system of claim 1, wherein the WebSocket connection is a bi-directional and full-duplex communication channel.

3. The system of claim 1, wherein the connection requested to be upgraded to the WebSocket connection includes an HTTP connection.

4. The system of claim 1, wherein the request identifies one or more subprotocols supported by a sender of the request.

5. The system of claim 1, wherein the request identifies a second set of one or more extensions to the WebSocket protocol.

6. The system of claim 1, wherein the request identifies a second set of one or more extensions to the WebSocket protocol natively supported by a web browser application.

7. The system of claim 6, wherein the set of one or more extensions identified by the identifier received via the WebSocket connection is not natively supported by the web browser.

8. The system of claim 1, wherein the communication interface is further configured to provide a component configured to handle the WebSocket connection.

9. The system of claim 8, wherein the component includes a software library component at least in part implementing a WebSocket API.

10. The system of claim 8, wherein providing the component includes inserting program code.

11. The system of claim 8, wherein the component is pre-configured to request the set of one or more extensions.

12. The system of claim 1, wherein the communication interface is further configured to provide a second response identifying support for one or more of the extensions in the set of one or more extensions.

13. The system of claim 1, wherein the communication interface is further configured to provide a second response in response to the received identification and the second response includes an HTTP communication status identifier.

14. The system of claim 1, wherein the response identifies a first selected subprotocol of the WebSocket connection.

15. The system of claim 14, wherein the received identification is encoded in the first selected subprotocol.

16. The system of claim 14, wherein the communication interface is further configured to provide a second response identifying support for one or more of the extensions in the set of one or more extensions and the second response identifies a second selected subprotocol.

17. The system of claim 1, wherein the received identification is encoded in the WebSocket protocol.

18. The system of claim 1, wherein the set of one or more extensions is dynamically determined.

19. A method, comprising:
   receiving via a communication interface a request to upgrade a connection to a WebSocket connection;
   providing a response that the connection has been upgraded to the WebSocket connection, wherein the WebSocket connection utilizes a WebSocket protocol; and
   receiving via the WebSocket connection, after the response has been received, an identification of a set of one or more extensions to the WebSocket protocol of the WebSocket connection.

20. A computer program product, the computer program product being embodied in a non-transitory tangible computer readable storage medium and comprising computer instructions for:
   receiving a request to upgrade a connection to a WebSocket connection;
   providing a response that the connection has been upgraded to the WebSocket connection, wherein the WebSocket connection utilizes a WebSocket protocol; and
   receiving via the WebSocket connection, after the response has been received, an identification of a set of one or more extensions to the WebSocket protocol of the WebSocket connection.

* * * * *